United States Patent [19]
Alesi, Jr.

[11] 4,023,755
[45] May 17, 1977

[54] TRANSFORMER MOUNTING PAD

[75] Inventor: John Alesi, Jr., Topanga, Calif.

[73] Assignee: Formex Manufacturing, Inc., Venice, Calif.

[22] Filed: June 24, 1976

[21] Appl. No.: 699,443

[52] U.S. Cl. .................................. 248/19; 336/65; 248/346

[51] Int. Cl.² .................... H02B 5/00; B65D 19/24

[58] Field of Search ...................... 248/19, 23, 346; 108/51.1, 53; 174/1, 37, 38, 50; 336/65

[56] References Cited

UNITED STATES PATENTS

| | | | |
|---|---|---|---|
| 1,811,881 | 6/1931 | Dina | 248/23 X |
| 2,998,216 | 8/1961 | Hurd | 248/19 |
| 3,142,162 | 7/1964 | Herndon | 248/20 X |
| 3,239,185 | 3/1966 | Sweeney | 248/358 R |
| 3,334,850 | 8/1967 | Jackson et al. | 248/19 |
| 3,404,642 | 10/1968 | Belcher et al. | 108/51.1 |
| 3,511,191 | 5/1970 | Barry et al. | 108/51.1 |
| 3,713,620 | 1/1973 | Trach | 248/19 |
| 3,841,032 | 10/1974 | Grannis | 248/19 X |
| 3,962,660 | 6/1976 | Duckett | 248/19 X |

Primary Examiner—J. Franklin Foss
Attorney, Agent, or Firm—Fulwider, Patton, Rieber, Lee & Utecht

[57] ABSTRACT

An improved mounting is provided for a residential transformer in which structural support for the load created by the weight of the transformer is provided by a wood and foam core enclosed within a plastic shell. Structural rigidity is provided by lateral and transverse cross braces connected to form a wooden framework. An aperture is formed through the structure and support blocks are provided at the interior boundary of the aperture and fasteners extend through the shell and through the support blocks of the framework to secure the shell to the framework. Reinforcing blocks are provided at the corners of the underside of the structure to prevent damage to the mounting whenever it is necessary to re-align or manipulate the mounting.

9 Claims, 4 Drawing Figures

U.S. Patent   May 17, 1977   4,023,755
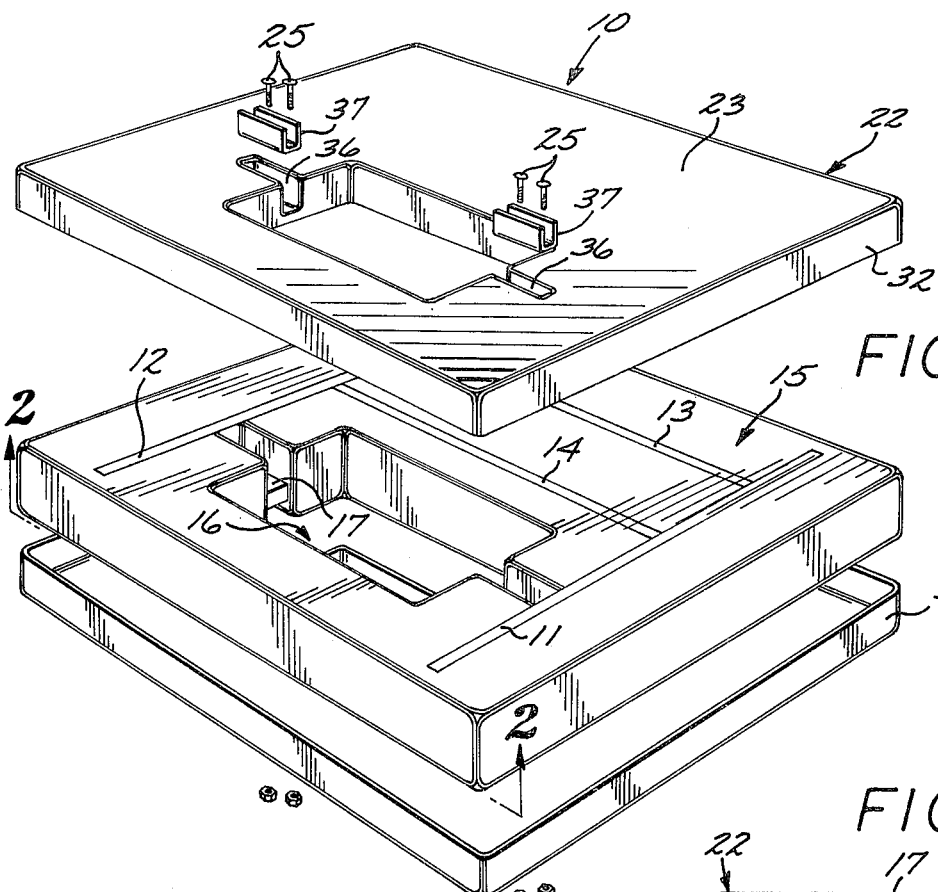
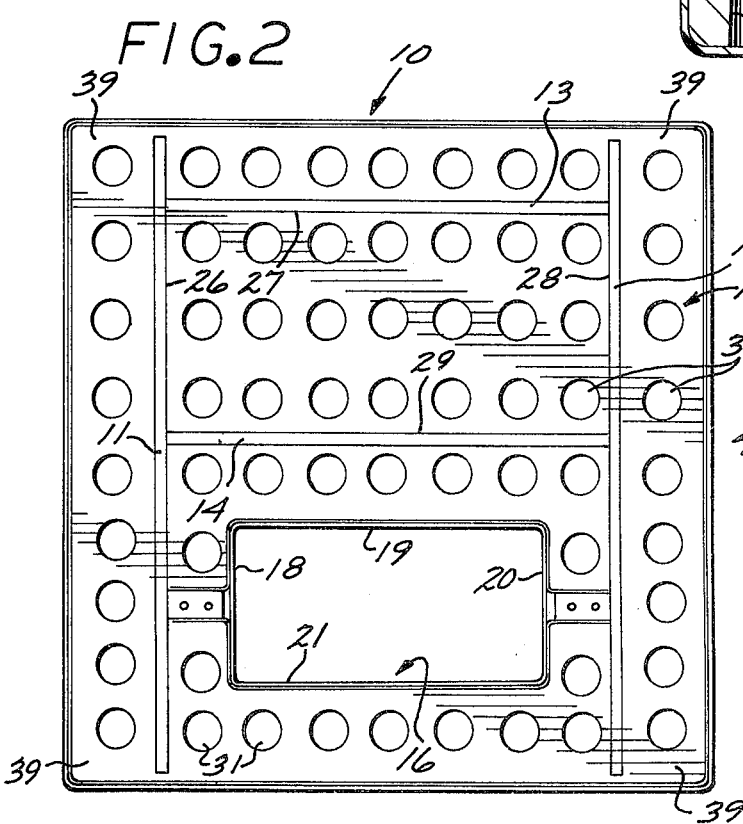
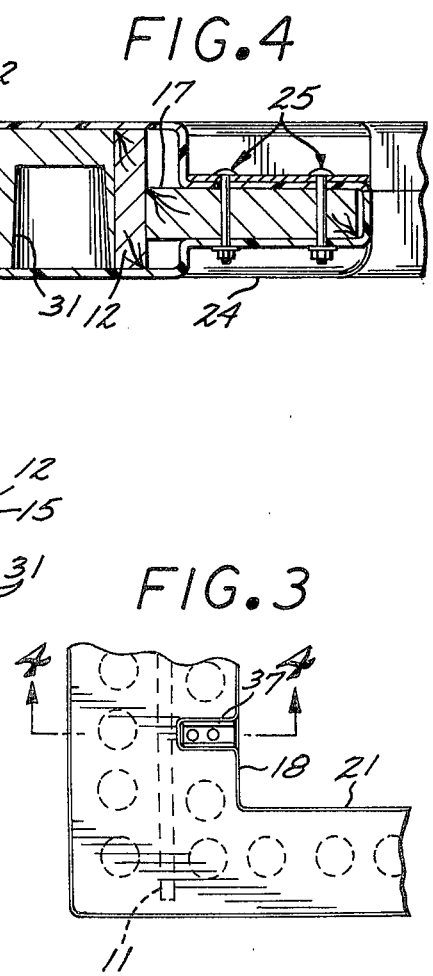

4,023,755

TRANSFORMER MOUNTING PAD

The present invention relates to an improved mounting pad for use in supporting an electrical power transformer.

BACKGROUND OF THE INVENTION

Throughout industrialized countries, electrical power transformers are placed at spaced intervals as intergral parts of an electrical power distribution system to bring electrical service to high density dwelling areas. These electrical power transformers step down the high voltage electrical current that is used for efficient long distance electrical power transmission to voltages of 110, 115, 220, 440 and other voltages commonly used to provide alternating current services to home and industrial subscribers by electrical utility companies.

The electrical transformers which are predominately employed to provide this home and industrial service usually weigh between about 300 and about 2,000 pounds.

Because the electrical transformers employed are installed for permanent operation, they must be supported upon a platform or mounting above the level of the ground soil, shrubbery, and ground water which might impair their operation. The transformers must be installed in positions to resist deterioration and degradation from environmental elements.

Several types of transformer mountings are currently used. Before the introduction of transformer mounting pads manufactured from plastic, pads were either cast in place or pre-cast using concrete. Although they are easier to manufacture, plastic pads have failed to adequately support transformers because of the effects resulting from heat generated by the transformers combined with ambient heat from the environment. The combined thermal effect causes the plastic transformer pads to soften with the result that the transformers sink into the plastic surface of the mounting pads. This poses problems of servicing transformers. Specifically, with typical transformer design, once the transformer sinks into the skin of the pad, the service panel is trapped and cannot be opened.

Another problem in conventional plastic transformer pads occurs because of the constant vibration of the working transformer. The instability of conventional plastic pads results in the transformer being tilted, thereby affecting the efficient operation of the transformer.

All of the alternative types of transformer pads or mountings involve significant disadvantages. In the case of concrete pads, the mounting may either be obtained in pre-cast form or poured in place at the job site. Mountings which are poured in place are usually expensive since the necessary forms, aggregate, equipment, etc. must be brought to the job site. In addition, this on-site construction of concrete mountings pads is extremely labor intensive and therefore quite expensive.

Another conventional type of mounting pad which is sometimes employed is a pre-cast concrete mounting structure. Such a structure is not as expensive to manufacture, since it is produced at a manufacturing site. However, pre-cast mounting supports weigh from 600 to 800 pounds and are quite difficult to transport and handle. Moreover, the pre-cast concrete mounting structures are frequently broken or cracked as they are manipulated into position.

Another alternative type of transformer-mounting pad which is currently employed is that formed entirely of fiberglass. Such a fiberglass structure is held together by a thermosetting plastic which may include an epoxy or polyester resin. Although functional and weather resistant, the fiberglass structures are expensive, as the cost of the materials used in their construction is quite large.

As previously noted, there have been attempts to produce a satisfactory transformer mounting from plastic. Such mounting supports are formed from a quantity of plastic, typically polyvinylchloride or polyethylene, which is poured into an enclosed mold. The mold is rapidly rotated so that centrifugal force causes the plastic to cover the interior walls of the mold. When cured, the hollow plastic structure may be removed and filled with a core of a supporting material, such as polyurethane foam. Alternatively, the rotationally cast structure may include aluminum reinforcing strips which are positioned within the mold prior to rotational casting. The finished product then includes the aluminum reinforcing strips entrapped within the structure employed as a transformer mounting.

As has been explained, however, such rotationally cast mounting pads tend to deteriorate due to their thermal and mechanical instability.

SUMMARY OF THE INVENTION

It is an object of the present invention to provide an improved plastic transformer mounting pad which is able to withstand mechanical and thermal stress. It is another object of the present invention to provide an improved mounting for an electrical power transformer which does not entail the handling or construction difficulties of concrete mounting pads.

A further object of the invention is to provide an improved transformer mounting which is substantially cheaper than fiberglass mounting pads and which is significantly more durable than the rotationally cast variety of transformer supports.

A further object of one embodiment of the invention is to provide a supporting structure which is reinforced at the corners of its lower surface so that the pad can be repositioned or realigned to a level orientation without suffering damage in the process. Such realignment might be necessary in those instances where there is uneven subsidence of the earth at the transformer location.

DESCRIPTION OF THE DRAWINGS

The various advantages and features of the invention may be more readily ascertained by reference to the accompanying drawings in which:

FIG. 1 is an exploded perspective view of the improved transformer mounting;

FIG. 2 is a sectional plan view of the underside of the improved mounting;

FIG. 3 is an enlarged view of the lower left hand corner of the mounting of FIG. 1.

FIG. 4 is a sectional view taken along lines 4—4 of FIG. 3.

DETAILED DESCRIPTION OF THE INVENTION

In a broad aspect the invention is an improved mounting 10 for supporting an electrical power transformer. The mounting 10 includes a wooden framework having lateral braces 11 and 12 and transverse braces 13 and 14 joined together and defining a quadrilateral enclosure, as indicated in FIG. 2. The walls of the enclosure are formed by the cross braces 11, 12, 13, and 14 to provide support for a variety of transformer configurations.

A cellular structure 15 surrounds and encases the wooden framework and defines an aperture 16 located between the lateral braces 11 and 12. A plurality of interior supports blocks 17 are fastened to and extend interiorally from the lateral braces 11 and 12 through the cellular structure 15 to opposing boundaries 18 and 20 of the aperture 16. A plastic shell 22 encases the wooden framework formed by the braces 11, 12, 13 and 14 as well as the cellular structure 15. The plastic shell 22 has upper and lower generally planar surfaces 23 and 24, and a walled opening therein conforms to the aperture 16. Fastening means 25 extend through the shell 22 and through the support blocks 17 to secure the shell 22 to the framework.

In the embodiment of the invention depicted, the wooden cross braces 11, 12, 13 and 14 are formed of 1 inch by 6 inch boards of Douglas fir joined at right angles. The cross braces are joined to provide lateral rigidity and interior support for vertical loads which result from the weight of the transformer on the mounting pad 10. The pair of lateral cross braces 11 and 12 are aligned in parallel and are arranged with the pair of transverse cross braces 13 and 14 extending therebetween. The transverse braces 13 and 14 are mutually parallel and are perpendicular to the lateral braces 11 and 12 and are located interiorally from the extremities of the lateral braces 11 and 12 to form a rectangle having perimetral walls 26, 27, 28 and 29. The dimensions of the rectangle are chosen so that a transformer can rest upon the mounting 10 and can be located so that it is centered above the rectangle with its load bearing almost directly down upon the cross braces.

From the drawings it can be seen that the transverse cross brace 14 is centrally located with the rectangle formed by the boundary walls, 26, 27, 28 and 29 defined on one of its sides and with the aperture 16 defined on its other side.

The cellular structure 15 may be foamed in around the wooden framework and may be formed of styrofoam or polyurethane foam. Preferably, the cellular structure 15 is shaped with a multiplicity of recesses 31 extending at least part way through the structure. These recesses may be generally cylindrical or cup-shaped as indicated, and are aligned along parallel axes perpendicular to the planar surfaces 23 and 24 of the plastic shell 22.

The two halves 32 and 33 of the plastic shell 22 are formed and joined insitu about the wooden framework and the cellular structure 15 by a double vacuum forming process, such as that described in U.S. Pat. Nos. 3,914,103, 3,914,104 and 3,910,747. The shell 22 is preferably formed of a high density polyethylene plastic, which may be colored as desired and stablized against ultraviolet radiation.

Two interior support blocks 17 are positioned between and secured to the lateral cross braces 11 and 12 in the manner illustrated in FIG. 4. The support blocks 17 are fastened to the lateral cross braces, by glue screws or other convenient means. The support blocks 17 extend interiorally from the lateral cross braces 11 and 12 through the cellular structure 15 to opposing boundaries of the aperture 16. The support blocks 17 are preferably of square cross section, about 4 inches on a side. Fasteners 25, in the form of bolts, with bolt heads and threadably engaging nuts, extend through the shell 22 and apertures in the support blocks 17 to secure the shell 22 to the wooden framework. The depth of the cross braces is greater than the depth of the support blocks 17 and a portion of the upper lateral surfaces of the support blocks 17 is not encased in the cellular structure 15. Recesses 36 are formed at the edges 18 and 20 of the aperture 16 to receive U-shaped metal fittings 37 which conform to the recesses 36 and which are mounted therein and secured to the support blocks 17 by the fasteners 25. The fittings 37 are used to accomodate and secure a transformer on the mounting pad 10. The aperture 16 formed in the transformer mounting pad 10 is bounded by the walls 18, 19, 20 and 21. The aperture 16 so formed allows buried electrical cables to emerge from the ground and pass into the transformer positioned on top of the mounting 10 without any external exposure. Therefore, there is no safety hazard to any unwary individuals who might otherwise be seriously injured or killed through inadvertent contact with the high voltage cables entering the transformer.

An additional feature of the transformer mounting pad 10 which should be noted is the prevision of reinforcing blocks 39 at the corners of the underside of the cellular structure 15. The reinforcing blocks 15. The are preferably about 4 inches square and are provided at the lower extremities of the lateral cross braces 11 and 12. The lower surfaces of the reinforcing blocks 39 are in contact with the interior surface of the lower half 33 of the plastic shell 11. Thus, should the mounting 10 become uneven or canted by subsidence of the soil upon which the pad 10 rests, one or more of the corners of the mounting may be pried or lifted up without puncturing the shell 22. Once the mounting 10 has been reoriented to again lie in a level position, the necessary soil can be filled in beneath the structure so that the mounting 10 may once again be disposed in a level position.

The foregoing detailed description of one embodiment of the invention has been depicted for purposes for illustration only, and no unnecessary limitation should be construed therefrom as various other embodiments and modifications will become readily apparent to those skilled in the field of the invention from the disclosure herein.

I claim:

1. An improved mounting for supporting an electrical power transformer comprising:
    a wooden framework with intersecting lateral and transverse cross braces joined together and defining a quadrilateral enclosure the walls of which are formed by ones of said cross braces to provide support for a variety of transformer configurations;
    a cellular structure surrounding and encasing said framework and defining an aperture located between lateral ones of said braces,
    a plurality of support blocks fastened to and extending interiorly from ones of said lateral braces through said cellular structure to opposing boundaries of said aperature,
    a plastic shell encasing said wooden framework and said cellular structure with upper and lower generally planar surfaces and having a walled opening therein conforming to the aforesaid aperture; and fastening means extending through said shell and through said support blocks to secure said shell to said framework.

2. The improved mounting in claim 1 wherein said framework further comprises a pair of lateral cross braces with a pair of transverse cross braces extending between said lateral cross braces and located interiorally from the extremities thereof, whereby one of said transverse cross braces is centrally located with the aforesaid quadrilateral defined on one side thereof and with the aforesaid aperture defined on the other side thereof.

3. The improved mounting of claim 2 wherein the depth of said cross braces is greater than the depth of said support blocks, and at least a portion of at least one lateral surface of each of said support blocks is not encased in said cellular structure, and said plastic shell is conformed to the surface of said cellular material and said support blocks, thereby forming opposing recesses at edges of said aperture, and metal fittings conforming to said recesses are mounted therein and secured to said support blocks by said fastening means.

4. The improved mounting of claim 1 wherein said cellular structure is shaped with a multiplicity of recesses extending at least part way therethough aligned in a direction perpendicular to said planar surfaces.

5. The improved mounting of claim 1 where said cellular structure is formed of styrofoam.

6. The improved mounting assembly of claim 1 wherein said cellelar structure is formed of polyurethane.

7. The improved mounting of claim 1 wherein said plastic shell is formed of high density polyethylene.

8. The improved mounting of claim 1 wherein said support blocks are attached to lateral ones of said cross braces and said fastening means are bolts having heads and nuts, and said support blocks are counter-sunken from the cross braces to which they are attached to receive the heads and nuts of said fastening means between said upper and lower planar surfaces of said shell.

9. The improved mounting of claim 1 wherein laterally extending reinforcing blocks are provided at the corners of the underside of said cellular structure and said reinforcing blocks are fastened to ones of said cross braces and are in contact with the interior of said lower planar surface of said plastic structure.

* * * * *

UNITED STATES PATENT OFFICE
CERTIFICATE OF CORRECTION

Patent No. 4,023,755      Dated May 17, 1977

Inventor(s) John Alesi, Jr.

It is certified that error appears in the above-identified patent and that said Letters Patent are hereby corrected as shown below:

In the specification, Column 4, line 28, delete "15. The" second occurrence, and insert -- 39 --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*